Patented Sept. 21, 1954

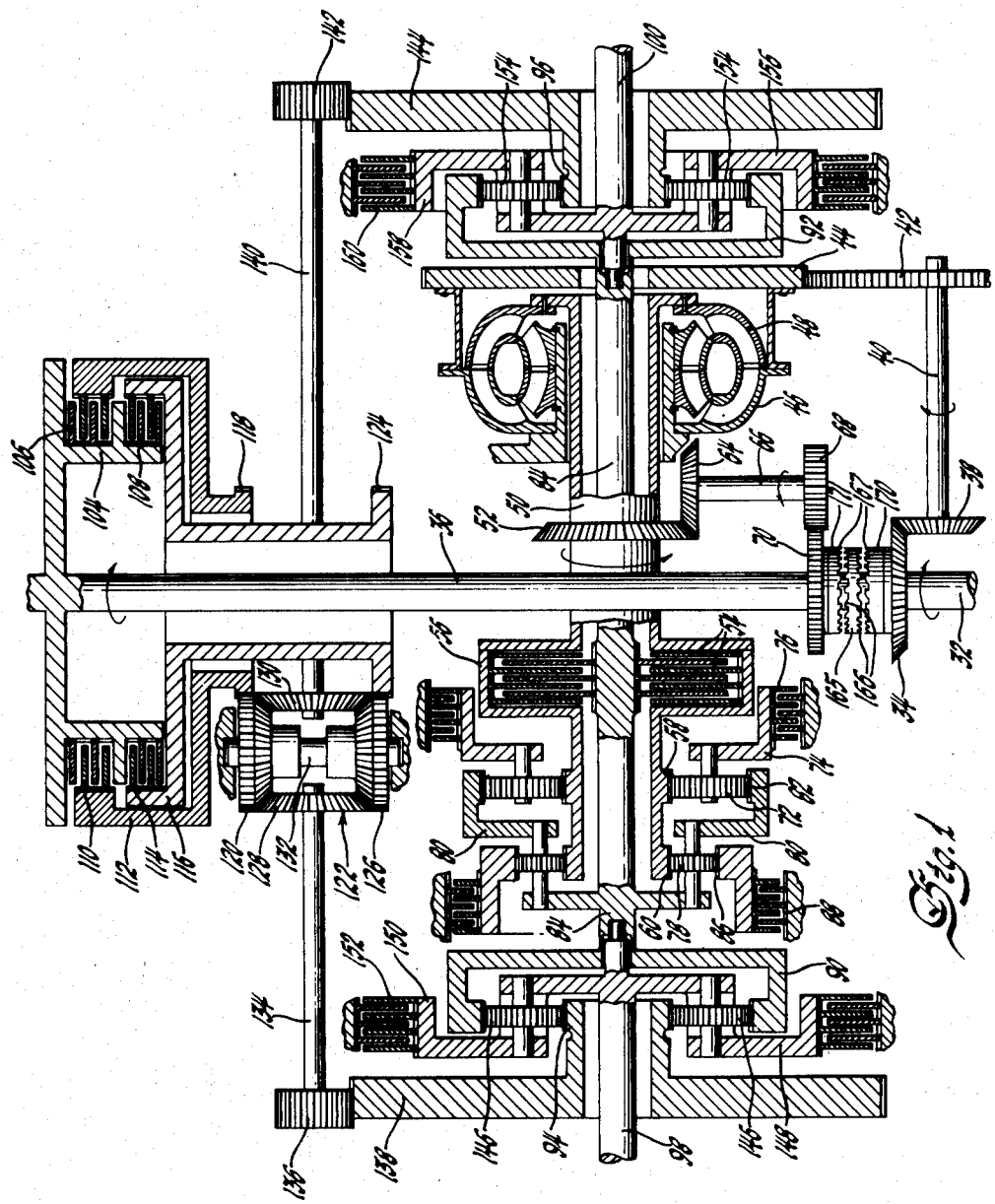

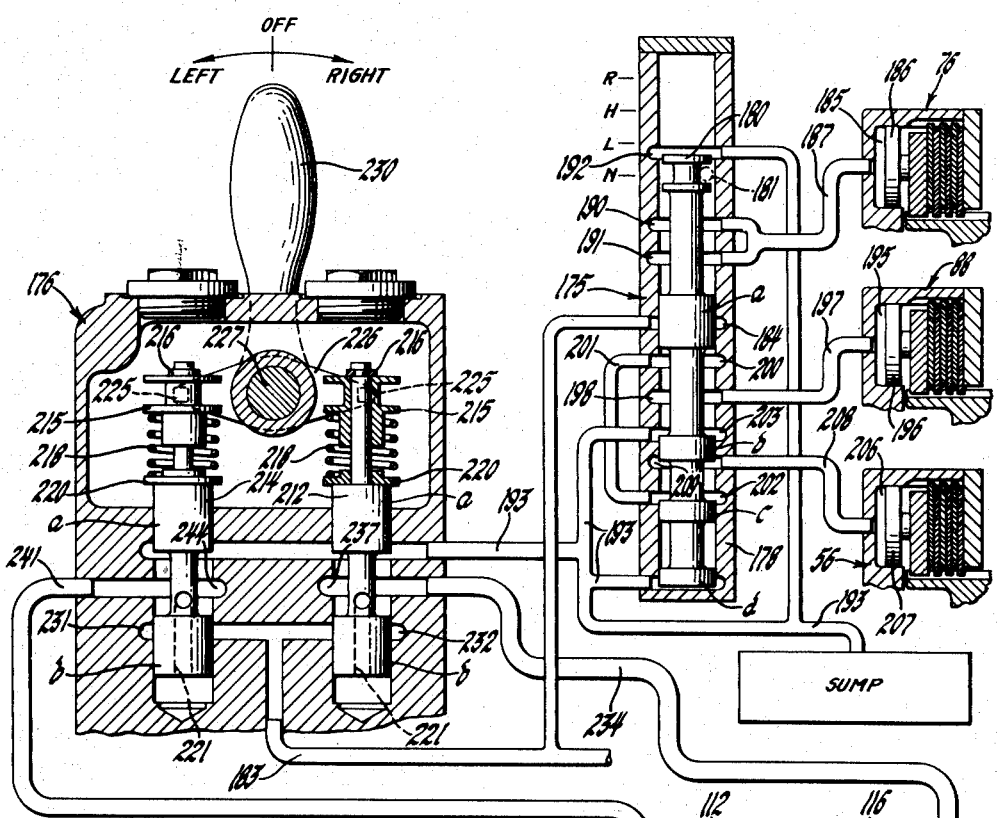
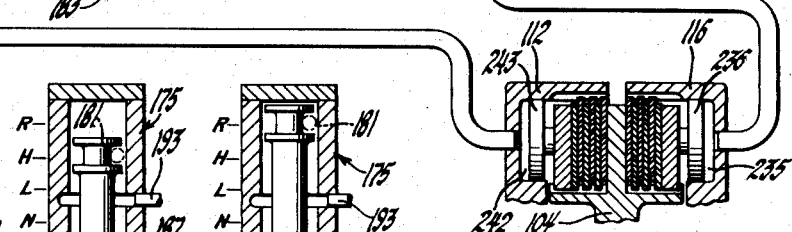
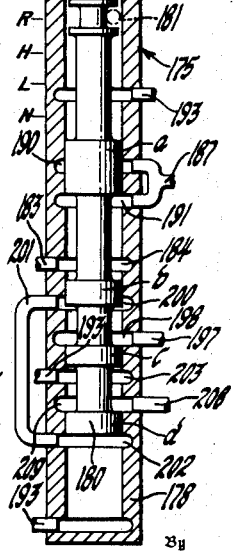
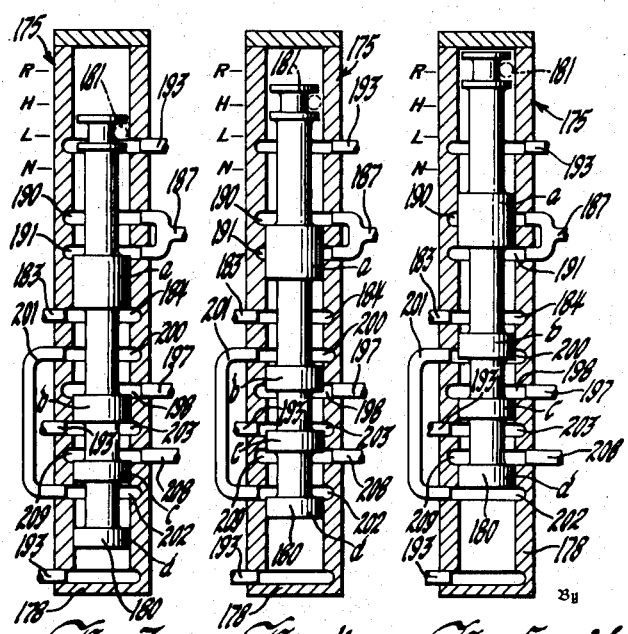

2,689,488

UNITED STATES PATENT OFFICE 2,689,488

STEERING DRIVE FOR VEHICLE
TRANSMISSIONS

John E. Storer, Jr., and William G. Livezey,
Indianapolis, Ind., assignors to General Motors
Corporation, Detroit, Mich., a corporation of
Delaware Application August 11, 1950, Serial No. 178,912

15 Claims. (Cl. 74—710.5)

This invention relates to transmissions for self-propelled vehicles and more particularly to a cross drive transmission incorporating improved vehicle steering means.

Self-propelled track laying vehicles are widely used both commercially and in military applications. In many of these uses, particularly the military vehicles, it is desirable that the vehicle be as maneuverable at all speeds as is permitted by the terrain over which the vehicle is operated. There are three widely used methods of steering vehicles of this type.

Perhaps the oldest type of steering used on track laying vehicles consists of braking one of the differentially driven tracks so as to permit the other track to travel at a faster rate and thus turn the vehicle. It is possible with this steering mechanism to lock one of the tracks so as to cause the vehicle to turn about that track as a pivot, thus giving a very short turning radius. However, such a steering mechanism is subject to many difficulties, one of the more important being that the vehicle is hard to control at high speeds because of the sensitivity of the braking mechanism. This type of steering mechanism is simple and is quite satisfactory for low speed vehicles.

The second type of steering for track laying vehicles is commonly called vehicle steer. In this type of steering the speed of one of the tracks is increased and the speed of the other track is decreased by a function of the forward speed of the vehicle. Accordingly, with this type of steering the minimum turning radius is constant regardless of vehicle speed. Although this method of steering may be proportioned to permit a turning radius limited only by the terrain at high speed, it does not give a sufficiently short turning radius at low speeds for most effective maneuverability.

The third general type of steering has been referred to as engine steer. In this type of steering, the velocity of one of the vehicle tracks is increased, and the velocity of the other track is decreased, by a function of engine speed. The turning radius is thereby made a function of engine speed, and at low vehicle speeds a very short turning radius is permitted, while at zero vehicle speed, the vehicle may be caused to turn about a point midway between the tracks and thus rotate about its own approximate center. However, the engine speed and the vehicle speed do not always have the same relationship to each other, and under some conditions the vehicle speed may greatly exceed the engine speed, as for example, when the vehicle is traveling down grade. Under these conditions of high vehicle speed and low engine speed, engine steering does not provide a sufficiently short turning radius to give the desired maneuverability.

Thus it may be seen that although the type of steering referred to first above, namely, braking one track, gives certain desirable maneuverability characteristics, it has other defects which make it undesirable for use on high speed tanks or other military vehicles. The other types of steering described above give the desired smoothness of operation, but one of these, that is vehicle steer, has shortcomings under low speed vehicle operation, while the other, that is engine steer, has shortcomings under high speed vehicle operation. Brake steering is inferior to engine steer during low speed operation and is inferior to vehicle steer during high speed operation. It is, therefore, desirable to combine both engine and vehicle steer characteristics to get the best maneuverability and steering characteristics at all vehicle speeds.

In some of the transmissions which have been developed for track laying vehicles, power is transmitted from the engine through step up gearing to a hydraulic torque converter, and then to the vehicle tracks either directly or through one or more stages of gear reduction. The inherent operation of a torque converter is such that the speed of the torque converter output or driven element relative to the torque converter input or driving element varies with variations in the speed of the torque converter and with variations in the torque transmitted through the unit. Hence, the relative speeds of the engine driven shaft and of a member driven from the torque converter output or driven element vary so that under conditions of low speed and high torque transmission, a member driven from the torque converter output shaft rotates more slowly than the engine, but under conditions of high speed and low torque transmission a member driven from the torque converter output shaft rotates more rapidly than the engine. The torque transmitted through the torque converter is affected by the change speed gears interposed between the torque converter and the members for driving the vehicle treads, and is also affected by driving conditions of the terrain over which the vehicle is operated. As a result, during acceleration of a vehicle from standstill to an intermediate speed, the speed of rotation of the engine driven element may exceed the speed of rotation of the member driven by the torque converter output or driven element during several different separate spaced short periods, while the speed of the member driven from the torque converter output shaft will exceed the speed of the engine driven element during the intervening periods.

In addition, the operation of a hydraulic torque converter is such that when the vehicle moves faster than the engine, as when the vehicle is traveling down grade, the member driven by the torque converter output or driven element, rotates more rapidly than the input or engine driven element.

The maximum degree of maneuverability is provided by arranging the apparatus so that the steering means is driven from the engine driven element or from the torque converter output element, depending upon which one of these elements is rotating more rapidly.

An object of the present invention is to provide an improved track type vehicle steering mechanism giving high vehicle maneuverability.

A further object of the present invention is to provide automatic means for selecting either engine steer or vehicle steer, whichever gives the shorter turning radius.

Another object of the present invention is to provide means for increasing or decreasing the speed of one of the tracks of a track type vehicle by a function of engine speed, or by a function of vehicle speed, depending on which will give the shorter turning radius.

A further object of the invention is to provide for a track type vehicle driven through a torque converter, a steering mechanism which is arranged to permit increasing or decreasing the speed of one of the tracks by a function of the torque converter input, or a function of torque converter output, depending on which gives the shorter turning radius.

Another object of the present invention is to provide a speed selective automatic clutch mechanism for selecting one or the other of two drive inputs depending on which has the highest rotational velocity.

A further object of the invention is to provide an improved transmission of the type described and incorporating means for causing the vehicle to be steered at rates which vary with the engine speed at low vehicle speeds, and for causing the vehicle to be steered at rates which vary with the vehicle speed at high vehicle speeds.

Another object of the invention is to provide means for limiting the torque applied to a member which is driven through a hydraulic torque converter.

Other objects of this invention and features of novelty will become apparent from the following description taken in connection with the accompanying drawings.

In practicing our invention we provide a transmission in which power is supplied to one track through a first planetary gear unit and is supplied to the other track through a second planetary gear unit. The reaction gears of these planetary gear units are connected together through reaction gears. Means including a right and a left steer clutch are provided to drive the reaction gears from a steering shaft and thus cause the speed of one or the other of the two tracks to be increased, and that of the remaining track to be decreased, by an amount limited by the speed of rotation of the steering shaft. The steering shaft is driven from the engine through a first overrunning clutch, and is driven from the torque converter output element through a second overrunning clutch. Hence, the steering shaft is driven by the driving member having the highest rotational speed, and operates automatically to provide the maximum rate of turn for the vehicle under all operating conditions, while the torque applied to the steering shaft through the torque converter is limited by the fact that if the speed of the torque converter output element relative to the torque converter input element is reduced beyond a predetermined value, indicating high torque multiplication in the torque converter, the torque converter output element will be ineffective to drive the steering shaft since the steering shaft will be driven directly from the engine.

In the drawings,

Fig. 1 is a schematic diagram of a transmission incorporating the improved steering means provided by this invention;

Fig. 2 is a schematic diagram of the hydraulic system for controlling the operation of the transmission shown in Fig. 1; and Figs. 3, 4 and 5 are diagrams showing the movable element of one of the control valves in different operating positions.

Referring to the drawings, Fig. 1 is a diagram of a transmission embodying our invention. It is contemplated that the transmission will be mounted in the rear of the vehicle and that the engine will be located in front of the transmission. Accordingly, the output or driven shaft which extends from the left hand side of the transmission, as viewed in Fig. 1 of the drawings, drives the right hand track of the vehicle, while the output or driven shaft which extends from the right hand side of the transmission drives the left hand track of the vehicle. In addition, it is contemplated that the engine rotates in the usual direction, that is, in the clockwise direction as viewed from the front, and that the transmission input shaft is driven in the same direction as the engine.

The transmission input shaft 32 is assumed to be directly connected to the vehicle power plant, not shown, and has rigidly secured thereto a bevel gear 34. Force is transmitted from the shaft 32 through two different paths, one through the steering clutch driving shaft 36, and the other through the bevel gear 38 which is constantly in engagement with the gear 34. The gear 38 through its associated shaft 40, gear 42, and gear 44 drives the pump or impeller 46 of a conventional four-element torque converter, the various gears being proportioned so that the torque converter input element or impeller 46 is driven somewhat more rapidly than the engine driven shaft 32. The torque converter turbine or driven member 48 drives a hollow shaft 50 carrying a bevel gear 52, one set of plates 54 of the high or direct drive clutch 56, and the sun gears 58 and 60. The bevel gear 52 meshes with a mating gear 64 which through a shaft 66 and spur gear 68 drives gear 70 and, as hereinafter explained, thereby drives a second input to the steering clutch driving shaft 36, the various gears being proportioned so that the gear 70 rotates somewhat more rapidly than the torque converter driven element 48. In addition, the various gears are arranged so that the gear 70 is rotated in the same direction as the engine driven shaft 32 and the gear 34. In a typical transmission, the various gears are proportioned so that the gear 70 rotates faster than the shaft 32 whenever the speed of the torque converter output element 48 is one-half or more of the speed of the torque converter input element 46, but it is to be understood that the invention is not limited to these gear ratios.

The sun gear 58 drives planet gears 72 which are carried by a carrier 74 which may be anchored to the transmission housing by the reverse brake 76 to obtain reverse drive. The sun gear 60 drives planet gears 78 which are supported by carrier 80 which has rigidly attached thereto a ring gear 82 of the reverse planetary gear system, and which also has rigidly attached thereto the main driving shaft 84. The planet gears 78 also mesh with the low gear planetary system ring gear 86 which may be anchored to the housing of the transmission by the low speed brake 88 for low gear drive. The main driving shaft 84 drives the ring or orbit gears 90 and 92 which are one of the input gears of the planetary gear differential systems driving the right and left tracks, respectively, of the vehicle. The other input gears of these planetary gear differential systems are the sun gears 94 and 96, respectively, which are actuated through the steering mechanism, as hereinafter explained. Under normal operating conditions the two sun gears 94 and 96 react against each other so as to become reaction members, but under steering conditions one of these sun gears is rotated backwards while the other is rotated forwards, thus causing a differential in speed between the output shafts 98 and 100. The output shaft 98 has secured thereto a member, not shown, for driving the right hand track of the vehicle, while the output shaft 100 has secured thereto a member, not shown, for driving the left hand track of the vehicle.

The steering clutch driving shaft 36 has secured thereto a drum 104 on which are mounted the driving plates 106 of the left steer clutch, and on which are also mounted the driving plates 108 of the right steer clutch. As hereinafter explained, these driving plates of the left and right steer clutches are rotated at all times during vehicle operation, the rate of rotation of these discs being that of the engine, or that determined by gear 70 which is driven by the torque converter output element 48, depending on which will cause the steering clutch discs to be rotated the more rapidly.

The left steer clutch has driven plates 110 which are carried by the clutch driven member 112, while the right steer clutch has driven plates 114 which are carried by a clutch member 116. The member 112 of the left steer clutch has secured thereto a spur gear 118 which meshes with the spur gear 120 of the reaction gear unit 122. Similarly, the member 116 of the right steer clutch has secured thereto a spur gear 124 which meshes with the spur gear 126 of the reaction gear unit 122. The spur gears 120 and 126 of the reaction gear unit 122 have formed integral therewith bevel gears which mesh with the bevel gears 128 and 130 of the reaction gear unit 122. The gears 120 and 126 are rotatably mounted on a shaft 132 which is supported in suitable manner by the transmission housing.

The gear 128 is rigidly secured on one end of a shaft 134, on the other end of which is rigidly secured the spur gear 136 which meshes with the gear 138 to which is secured the sun gear 94. Similarly, the gear 130 is rigidly secured to one end of a shaft 140, on the other end of which is rigidly secured the spur gear 142 which meshes with the gear 144 to which is secured the sun gear 96.

The sun gear 94 and the ring or orbit gear 90 both mesh with the planet gears 146 which are mounted on a carrier 148. The carrier 148 is rigidly secured to the output shaft 98, and is also rigidly secured to the drum 150 which carries one set of plates 152 of the service brake. In like manner, the sun gear 96 and the ring or orbit gear 92 mesh with the planet gears 154 which are mounted on a carrier 156. The carrier 156 is rigidly secured to the output shaft 100, and is also rigidly secured to the drum 158 which carries one set of plates 160 of the service brake.

For purposes of illustration it will be assumed that the engine driven shaft 32 rotates from left to right as viewed in Fig. 1 of the drawings, that is in a clockwise direction as viewed from the front of the vehicle in which the transmission is mounted. Hence, the shaft 40 rotates in a clockwise direction, as viewed from the end on which the gear 42 is secured, and causes the torque converter driving and driven elements, and the shaft 50, to rotate in a counterclockwise direction, when viewed from the right hand end of this figure of the drawings. As a result, when the direct drive clutch 56 is engaged, or when the low speed brake 88 is engaged, the shaft 84 rotates in the same direction as the shaft 50, that is in the counterclockwise direction when viewed from the right hand end of Fig. 1 of the drawings.

On this rotation of the shaft 84 the orbit gears 90 and 92 are also rotated and cause the planet gears 146 and 154 to rotate about the sun gears 94 and 96, respectively, with the result that the carrier 148 rotates the output shaft 98, and the carrier 156 rotates the output shaft 100, the output shafts 98 and 100 both being rotated in the counterclockwise direction as viewed from the right hand end of Fig. 1 of the drawings so that the vehicle tracks are driven in the direction to cause forward movement of the vehicle. At the same time force is exerted on the sun gears 94 and 96 and the associated gears 138 and 144, tending to rotate them in the direction opposite to that in which the gears 90 and 92 and the planet carriers 148 and 156 are rotated.

The force exerted on the sun gears 94 and 96 causes the gears 138 and 144 to exert force tending to rotate the gears 136 and 142, respectively, in the same direction as the shaft 84. Hence, the gear 136 exerts force through the shaft 134 and the gear 128 upon the gears 120 and 126, while the gear 142 exerts force through the shaft 140 and the gear 130 upon the gears 120 and 126. The forces exerted upon each of the gears 120 and 126 by the gears 128 and 130 are opposite in direction so that all of the gears, including the sun gears 94 and 96, remain stationary and the sun gears 94 and 96 serve as reaction gears for the planetary systems in which they are incorporated.

When the left steer clutch is applied, the driving plates 106 and the driven plates 110 are clamped together so that the clutch member 112 rotates in the same direction as the drum 104 and the shaft 36. On this rotation of the clutch member 112 the gear 118 rotates the gear 120 of the reaction gear unit 122 with the result that the bevel gear associated with gear 120 rotates gear 128 in the clockwise direction as viewed from the right hand end of Fig. 1 of the drawings, and rotates gear 130 in the opposite direction. On rotation of gears 128 and 130 by the gear 118, the gear 126 drives the gear 124 and the drum 116 of the right steer clutch in the direction opposite to the shaft 36 and drum 104. The right steer clutch is disengaged at this time so the clutch member 116 is free to rotate.

On rotation of gear 128 by the gear 120, the gear 128 turns shaft 134 and gear 136 so that the gear 136 turns the gear 138 and the attached sun gear 94 in the counterclockwise direction, as viewed from the right hand end of this figure of the drawings, that is in the same direction as shaft 84 and ring or orbit gear 90. This rotation of the sun gear 94 increases the speed of the planet gears 146 and of the associated carrier 148 and the attached shaft 98, so that the shaft 98 turns faster than it would turn if driven solely by the shaft 84, and thus increases the speed of the right hand track of the vehicle.

On the other hand, the gear 136 turns the shaft 140 and gear 142 so that the gear 142 turns the gear 144 and the attached sun gear 96 in the clockwise direction, as viewed from the right hand end of Fig. 1 of the drawings, that is in the direction opposite to that in which the shaft 84 and the ring or orbit gear 92 are turning. This rotation of the sun gear 96 changes the speed of the planet gears 154, and decreases the speed of the carrier 156 and the attached output shaft 100, so that the output shaft 100 turns less rapidly than it would turn if driven solely by the shaft 84, thereby reducing the speed of the left hand track of the vehicle.

From the foregoing it will be seen that when the vehicle is being operated in the forward direction and the left steer clutch is engaged, force is transmitted through the reaction gear unit 122 to decrease the speed of the output shaft 100 and to increase the speed of the output shaft 98 relative to the main drive shaft 84, thus causing the right hand track to be driven faster than the left hand track and thereby causing the vehicle to turn to the left.

In similar manner, when the vehicle is being operated in the forward direction and the right steer clutch is engaged, the clutch member 116 rotates in the same direction as the shaft 36 and the gear 124 carried by the clutch member 116 turns the gear 126 and causes the bevel gear associated with gear 126 to drive the gears 128 and 130 in directions opposite to each other, and also opposite to the directions in which the gears 128 and 130 are rotated when driven by the gear 118 associated with element 112 of the left steer clutch. As a result of this rotation of the gears 128 and 130, the gear 120 turns and drives the gear 118 and the clutch element 112 in the direction opposite to the shaft 36, but as the left steer clutch is disengaged, the element 112 is free to rotate. In addition, as a result of this rotation of the gears 128 and 130, the ring gears 138 and 144, together with the accompanying sun gears 94 and 96, are rotated. The direction of rotation of the sun gears 94 and 96 is opposite to that which occurs when the left steer clutch is engaged. As a result the speed of the output shaft 100 is increased and the speed of the output shaft 98 is decreased relative to the shaft 84, thus causing the left hand track to be driven faster than the right hand track so that the vehicle turns to the right.

The rate at which the vehicle turns is determined by the difference in the rates at which the left and right hand tracks of the vehicle are driven, and this is dependent on the degree of engagement of a steering clutch, and also on the rate of rotation of the steering clutch driving shaft 36 relative to the main driving shaft 84.

The steering clutches are of the multiple disc type and each has a plurality of driving and driven plates which have effective driving engagement with each other only when pressed together with substantial force. Furthermore, the degree of driving engagement between the driving and driven plates of a clutch varies with the amount of pressure employed to press the clutch plates together. Each of the steering clutches includes a piston subject to the pressure of the liquid in a chamber at a face of the piston so that the clutch plates are pressed together with pressure which varies in accordance with variations in the pressure of the liquid in the chamber at the face of the piston. As hereinafter explained, the control system includes manually controlled means for supplying liquid to and releasing liquid from the chambers at the faces of the pistons of the steering clutches so that either of these clutches may be disengaged, or may be engaged variable amounts which range from slight engagement, in which the clutch driven element rotates at a relatively slow rate compared to the clutch driving element, to complete engagement in which the clutch driven element rotates at the same rate as the clutch driving element.

The manually controlled means for governing the pressure of the liquid in the chambers at the faces of the pistons of the left and right steer clutches enables the operator to steer the vehicle to the right or to the left as desired, and to also regulate the rate of turning of the vehicle from a very slow rate to the maximum which the steering clutches can transmit from the steering clutch driving shaft 36.

When one of the steering clutches is fully engaged so that the clutch driving and driven members rotate at the same speed, the amount by which the speed of one vehicle track is increased and by which the speed of the other vehicle track is decreased, and therefore the maximum rate of steering of the vehicle, is dependent upon the rate of rotation of the steering clutch driven shaft 36 relative to the speed of rotation of the main driving shaft 84.

This transmission is arranged so that under all conditions of vehicle and engine speed, the steering clutch driving shaft 36 will be driven at a speed which will permit the vehicle to be turned at a rapid rate and thereby insure that the vehicle has maximum maneuverability under all operating conditions.

The steering clutch driving shaft 36 is coupled through a first overrunning clutch with the gear 34 on the engine driven shaft 32, and is coupled through a second overrunning clutch with the gear 70 which is driven from the torque converter output element. This invention is not limited to the use of any specific form of overrunning clutch and any device of this kind may be employed which permits the shaft 36 to be driven from the gear 34, or from the gear 70, depending on which is rotating the faster, and which permits the shaft 36 to turn freely relative to the gear 34 or the gear 70 when the shaft 36 is rotating more rapidly than one of these gears.

Although this invention is not limited to the use of any particular type of overrunning clutch, we prefer to use an overrunning clutch of the type shown and claimed in our copending application Serial No. 183,162, filed September 5, 1950, now Patent #2,647,599, for Overrunning Clutch.

As illustrated, the steering clutch driving shaft 36 has secured thereto an annular hub member 165 which has teeth 166 formed in the axially opposite faces thereof. The teeth 166 are adapted to be engaged by counterpart teeth 167 on movable jaw clutch elements 170 and 171 associated with the gears 34 and 70, respectively. Each of the movable jaw clutch elements is connected with the associated gear in such manner as to be positively rotatable with the gear, but so as to be movable axially relative to the gear. In addition, each of the movable jaw clutch elements has associated therewith means effective on movement of the associated gear less rapidly than the hub member 165 to cause the movable jaw clutch element to move towards the hub member and establish driving engagement therewith. Similarly, each of the movable jaw clutch elements has associated therewith means effective on movement of the associated gear less rapidly than the hub member 165 to cause the movable jaw clutch element to move away from the hub member 165 so that the teeth on the movable jaw clutch element and on the hub member 165 are out of engagement with the result that the hub member may rotate freely without interference from the inactive one of the jaw clutch elements. This axial movement of each of the movable jaw clutch elements out of engagement with the hub member 165 is caused in part by the angle of the trailing faces on the teeth 166 on the hub member and also on the teeth 167 on the jaw clutch elements. The construction and operation of the overrunning clutch unit are explained in detail in the above identified application, S. N. 183,162.

The operation of the overrunning clutches is automatic and is such that the steering clutch driving shaft 36 is driven by the engine driven shaft 32 when the shaft 32 is rotating more rapidly than the gear 70, and so that the steering clutch driving shaft 36 is driven by the gear 70 when the gear 70 is rotating more rapidly than the engine driven shaft 32.

Accordingly, when the various clutches and brakes are disengaged so that no driving connection is established from the torque converter output member 48 to the driving shaft 84, the torque converter output element 48, because of the absence of load thereon, operates at a speed in excess of the speed of the input element 46, even at relatively low speeds of the engine. Hence, if under these conditions, one of the steering clutches 106 or 108 is engaged, the output shafts 98 and 100 are driven in opposite directions by power supplied from the torque converter output element 48 and the shafts 98 and 100 cause the vehicle tracks to move in opposite directions to thereby cause the vehicle to turn about its own center as an axis.

When the vehicle is being operated at low speed, the operation of the torque converter is such that the torque converter output element 48 rotates at a speed less than one-half the speed of the torque converter input element 46 with the result that gear 70 rotates at a slower rate than the gear 34. Hence, under these conditions the steering clutch driving shaft 36 is rotated by the engine driven shaft 32, and if one of the steering clutches 106 or 108 is engaged the speed of one output shaft will be increased and the speed of the other output shaft will be decreased so that the vehicle will turn. The maximum amount of the increase in the speed of one output shaft and of the decrease in the speed of the other output shaft is determined by the speed of rotation of the steering clutch driving shaft 36. As the steering clutch driving shaft 36 is being driven from the engine driven shaft 32, which is rotating more rapidly than the gear 70, which is driven in accordance with the rate of rotation of the torque converter output element, and therefore in accordance with the rate of movement of the vehicle, it follows that the maximum amount of change in the speed of the output shafts may be relatively great and may cause the vehicle to turn sharply. This is desirable since the vehicle is assumed to be travelling at a relatively low speed and therefore can turn sharply. The high rate of turning produced at this time by driving the steering clutch driving shaft 36 from the engine driven shaft instead of from the more slowly rotating torque converter output element, gives the vehicle the maximum degree of maneuverability.

When the vehicle is being operated at a high speed, the operation of the torque converter is such that the torque converter output or driven element 48 rotates at a speed one-half or more than that of the torque converter input element 46 with the result that the gear 70 rotates more rapidly than the gear 34. Accordingly, under these conditions, the steering clutch driving shaft 36 is rotated by the gear 70, which is driven from the torque converter output element, with the result that the rate of rotation of the steering clutch driving shaft 36 varies with the vehicle speed. If one of the steering clutches 106 or 108 is engaged, the rate of rotation of the output shafts 98 and 100 will be modified to cause the vehicle to turn, the maximum amount of change in the rate of rotation of the output shafts varying with the speed of the vehicle so that when the steering clutches are driven from the torque converter output element, the radius of turning of the vehicle is constant for each gear ratio provided for connecting the torque converter output member 48 with the main driving shaft 84, this radius being shorter in low gear than in high gear. The various parts are proportioned so that the radius of turning is the shortest which can be satisfactorily employed under conditions of relatively high vehicle speed.

Since at high vehicle speeds the steering clutch driving shaft 36 is driven through the gear 70 from the torque converter output element, instead of from the less rapidly rotating engine driven shaft 32, the rate of turn of the vehicle is at the maximum and the vehicle has the greatest maneuverability.

When the vehicle is being operated down a relatively steep grade, the shaft 50 and the torque converter driven element 48 may be driven by the vehicle so that the gear 70, which is driven from the shaft 50, is rotated at a much more rapid rate than the gear 34 on the engine driven shaft. Under these conditions the steering clutch driving shaft 36 is driven from the gear 70, and if one of the steering clutches is engaged, the maximum amount by which the speed of the output shafts 98 and 100 may be modified is proportional to the vehicle speed so that the vehicle may be turned at a rate substantially equal to that at which the vehicle may be turned when the vehicle is being operated at the same speed on level ground and is being driven by the engine. Hence, the vehicle has maximum maneuverability under these conditions.

Under conditions just described the engine is normally permitted to operate substantially at the idling speed, and if the steering clutch driving shaft 36 was always driven from the engine, the steering clutch driving shaft would be rotating at a relatively slow speed and would be incapable of producing sufficient change in the speed of the output shafts 98 and 100 to give the vehicle the desired degree of maneuverability. If the steering clutches were always driven from the engine and the various gear ratios were proportioned to provide adequate vehicle maneuverability under conditions of high vehicle speed and low engine speed, as occur when the vehicle is operated downgrade, the possible rate of turn would be excessive under other operating conditions. As this transmission is arranged to cause the steering clutches to be driven from the torque converter output element when the vehicle speed exceeds the engine speed, the transmission insures that the rate of turn permitted will be determined by the rate of movement of the vehicle, and further insures that the rate of turn permitted will be adequate to provide good maneuverability.

The operation of the equipment is such that the torque which may be applied through the torque converter to the steering shaft 36 is limited, thereby preventing damage to the steering mechanism by application thereto of excessive force. As previously pointed out, the various gears are proportioned so that the gear 70, which is driven by the torque converter output element, turns more rapidly than the engine driven gear 34 as long as the speed of the torque converter output element 48 is one-half or more of the speed of the torque converter input element 46. Likewise, the speed of the gear 70 is less than that of gear 34 when the speed of the torque converter output element 48 is less than one-half of the speed of the torque converter input element 46, that is when there is relatively high torque multiplication in the torque converter. As pointed out above, when the speed of the gear 70 is below the speed of the gear 34, the steering shaft 36 is driven from the engine through the gear 34, and the torque converter output element is ineffective to exert force on the steering shaft. It will be seen, therefore, that when operating conditions are such that torque multiplication in excess of a predetermined amount takes place in the torque converter, as shown by the reduction in the speed of the torque converter output element relative to the torque converter input element, the torque converter is ineffective to drive the steering shaft and cannot cause excessive force to be applied to the steering shaft. Under these conditions, the steering shaft is driven directly by the engine, and the maximum torque which can be applied to the steering shaft is that which is developed by the engine without multiplication by the torque converter.

In Fig. 2 of the drawings there is shown a diagram of one way in which the low, direct and reverse clutches and brakes may be manually controlled, and in which the left and right steer clutches 106 and 108 may also be manually controlled. As previously explained, these clutches and brakes are hydraulically operated and each includes a piston subject to the pressure of the fluid in a chamber and effective to cause the clutch or brake to engage on an increase in the pressure in this chamber. The steering clutches are arranged to be engaged amounts variable in accordance with the pressure in the chambers at the faces of the associated pistons, while the valves controlling the supply of fluid to these chambers are arranged to cause the pressure therein to be varied in accordance with the amount of movement of a control member away from its normal or intermediate position.

Referring to Fig. 2 of the drawings there is shown therein a valve device indicated generally by the reference numeral 175 controlling the low, direct and reverse clutches and brakes of the transmission, and a valve device indicated generally by the reference numeral 176 controlling the right and left steering clutches 106 and 108.

The valve device 175 comprising a body 178 having therein a substantially cylindrical bore in which there is located a valve element 180 which is manually movable to a plurality of operating positions. These positions are neutral, low, high, and reverse, and are indicated by the latters N, L, H and R, respectively. The movable element 180 has adjacent its upper end a narrow groove which is adapted to receive an operating member 181, by means of which the valve element may be manually moved between its different positions. The operating position of the valve element 180 is determined by the location of the operating member 181 relative to the positions indicated by the letters adjacent the valve. The valve member 180 has formed thereon lands or portions of large diameter indicated at $a$, $b$, $c$, and $d$, and separated by portions of reduced diameter. The body 178 of the valve device has formed therein a plurality of grooves which surround the bore in the body and have connected thereto pipes through which liquid flows to and from the valve device.

Liquid under pressure is supplied from a suitable source, such as an engine driven pump or a vehicle driven pump, not shown. This liquid is supplied through a pipe 183 to a groove 184 in the body 178 of the valve device. When the valve element 180 is in its neutral position, N, as shown in Fig. 2 of the drawings, the groove 184 is blocked by the land $a$ so that liquid under pressure is not supplied to any of the clutches or brakes controlled by this valve device.

The chamber 185 at the face of the piston 186 of the reverse brake 76 is connected by the branched pipe 187 to the grooves 190 and 191 which, when the valve element 180 is in the neutral position, are open through the groove 192 and its associated pipe 193, to the drain which may be a sump from which liquid is supplied to the pumps employed in the system.

The chamber 195 at the face of the piston 196 of the low speed brake 88 is connected by pipe 197 with the groove 198 in the body 178 of the valve device 175. When the valve element 180 is in the neutral position N the groove 198 is connected to the drain through the space between lands $a$ and $b$ on the valve element 180, the groove 200, space between lands $b$ and $c$ of the valve element, groove 203, and a branch of the pipe 193.

The chamber 206 at the face of the piston 207 associated with the high or direct drive clutch 56 is connected by a pipe 208 to the groove 209 in the body 178 of the valve device 175. When the valve element 180 is in the neutral position the groove 209 is connected to the drain through the space between lands $b$ and $c$ of the element 180, the groove 202, pipe 201, groove 200, space between lands $a$ and $b$ of the valve element 180, groove 203, and pipe 193.

When the valve element 180 is moved to the position L, as shown in Fig. 3 of the drawings, liquid under pressure supplied through pipe 183 to the groove 184 flows through the space between the lands $a$ and $b$ on the valve element 180 to the groove 198 and thence through the pipe 197 to the chamber 195 at the face of the piston 196 associated with the low speed brake 88. Hence, this brake is engaged and causes the transmission to drive the main drive shaft 84 at low speed.

When the valve element 180 is in the position L, liquid under pressure may flow through the connecting pipe 201 to the area between the lands c and d of the valve element 180, but is prevented by land c from flowing to pipe 208 leading to the direct drive clutch 56. At this time the pipe 208 leading to the direct drive clutch 56 is connected through the area between lands b and c of the valve element 180 to a branch of the pipe 193 leading to the drain. Hence, the direct drive or high speed clutch is disengaged. Similarly, when the valve element 180 is in its position L, the pipe 187 leading from the reverse brake 76 is connected through the area above land a of the valve element 180 to pipe 193 leading to the drain so the reverse brake is disengaged.

When the valve element 180 is moved to its high position H, as shown in Fig. 4 of the drawings, the pipe 187 leading from the reverse brake 76 continues to be connected to the pipe 193 leading to the drain so the reverse brake is disengaged. In addition, when the valve element 180 is in its position H, the supply of liquid under pressure to pipe 197 leading to the low speed brake 88 is cut off and the pipe 197 is connected through the area between lands b and c on the valve element 180 to pipe 193 leading to the drain. Accordingly, the low speed brake is released.

When the valve element 180 is in its position H, liquid under pressure flows from the pipe 183 through the area between lands a and b of valve element 180 to pipe 201, and thence through the area between lands c and d of valve element 180 of the pipe 208 leading to the chamber 206 at the face of the piston 207 associated with the high speed clutch 56. Accordingly, the high speed clutch is engaged and causes the main drive shaft 84 to be driven at the same speed as the shaft 50 associated with the torque converter output element 48.

When the valve element 180 is moved to its reverse position R, as shown in Fig. 5 of the drawings, the supply of liquid under pressure to the pipe 208 leading to the high speed clutch 56 is cut off and the pipe 208 is connected through the area between lands c and d of the valve element 180 to the pipe 193 leading to the drain. Hence, the high speed clutch is disengaged.

In this position of the valve element 180, the pipe 197 leading from the low speed brake 88 is connected through the area between lands b and c of valve element 180 to pipe 201, and thence to groove 202 which at this time is open to the drain through a branch of the pipe 193 at the lower end of the body 178 of the valve device 175.

In addition, when the valve element 180 is in its reverse position R, the upper branch of the pipe 187 is blocked by the land a of the valve element so that communication is cut off between the pipe 187 and pipe 193 leading to the drain. At this time liquid under pressure supplied through pipe 183 flows through the area between the lands a and b of valve element 180 to the groove 191, and thence through pipe 187 to the chamber 185 at the face of the piston 186 associated with the reverse brake 76. As a result the reverse brake is engaged and the torque converter output shaft 50 drives the main driving shaft 84 in the reverse direction.

The valve device 176 provides means for manually controlling the right and left steering clutches so that the vehicle may be caused to turn to the right or to the left as desired. This invention is not limited to the use of the particular valve device shown for controlling the steering clutches, and it is contemplated that these clutches may be controlled in the manner illustrated and described in detail in the application of John E. Storer, Jr., W. Gordon Livezey, and Elmer A. Richards, Serial No. 200,625, filed December 13, 1950.

As shown, the valve device 176 comprising a body having therein a pair of spaced parallel bores in which there are mounted valve elements 212 and 214. The valve elements 212 and 214 are similar in construction and each has at its upper end a stem portion of reduced diameter on which there is slidably mounted a bushing 215. Each of the bushings 215 is held on the stem of the associated valve element by a shoulder 216 on the valve element. Coil springs 218 are mounted between the bushings 215 and washers 220. The washers 220 are somewhat larger in diameter than the bores in the body of the valve device in which the valve elements 212 and 214 are located so the washers 220 limit downward movement of the valve elements by force transmitted through the coil springs. Each of the bores in the body of the valve device has therein a plurality of grooves to which are connected pipes leading from the source of fluid supply, leading to the clutches, or leading to the drain.

Each of the valve elements 212 and 214 has a portion of reduced diameter intermediate its ends so that each valve element has an upper land a and a lower land b. Each valve element has formed therein a passage 221 of restricted diameter and leading from the area between the associated lands a and b to the chamber at the base of the valve element.

The bushings 215 have annular grooves therein which are adapted to receive pins 225 on the ends of the rocker arm 226 which is secured on a shaft 227. The shaft 227 extends through an opening in the wall of the body of the valve device and has secured thereto an operating handle 230 which is adapted to be held by the hand of an operator so that the handle may be moved from its intermediate or off position to the left or to the right to cause the vehicle to be steered in the corresponding direction. The handle may be biased to its intermediate or off position by any suitable means, not shown. When the handle 230 is in its intermediate or off position the valve elements 212 and 214 occupy the positions in which they are shown in the drawings, and in which the lands b of these valve elements block the grooves 231 and 232 to which are connected a branch of the pipe 183 leading from the source of fluid under pressure.

In addition, at this time the pipe 234 which leads from the chamber 235 at the face of the piston 236 associated with the right steer clutch 108 is connected through groove 237 to the area between lands a and b of valve element 212 and thus to a branch of the pipe 193 which leads to the drain.

Similarly, the pipe 241 which leads from the chamber 242 at the face of the piston 243 associated with the left steer clutch 106 is connected through groove 244 and the area between the lands a and b of valve element 214 to the pipe 193 leading to the drain.

Accordingly, both steering clutches are disengaged, and if the vehicle is operated it will travel in a straight line.

When the operating handle 230 of the valve device 176 is moved in either direction from its intermediate or off position, the valve device 176 operates to supply to the corresponding steering clutch liquid at a pressure which varies in accordance with the amount of movement of the handle 230.

For example, when the handle 230 is moved to the right from its off position, a pin 225 on the rocker arm 226 exerts force through the bushing 215 and the spring 218 to move the valve element 212 downwardly with the result that the upper land a on this valve element cuts off communication between groove 237 and the passage associated with pipe 193 leading to the drain. In addition, on this movement of the valve element 212, the lower land b is moved to the position to permit liquid under pressure supplied through pipe 183 to the groove 232 to flow to the area between the lands a and b of valve element 212 and thence through pipe 234 to the chamber 235 at the face of the piston 236 of the right steer clutch. Liquid supplied to the area between lands a and b of the valve element 212 also flows through the passage 221 in this valve element to the chamber at the base of the valve element and exerts force to move the valve element upwardly against the opposing force of the associated coil spring 218. When the pressure in the chamber at the base of the valve element, and also in the chamber of the right steer clutch builds up enough to overcome the spring 218, the valve element 212 is moved upwardly to an intermediate position in which the land b cuts off the supply of fluid from the groove 232 to the groove 237 and thus to the pipe 234 leading to the right steer clutch. In addition, in this position of the valve element 212, the land a of the valve element cuts off communication between the groove 237 and the passage in the body of the valve device 176 to which is connected pipe 193 leading to the drain.

Accordingly, when the pressure of the liquid supplied through the valve element 212 builds up to a value sufficient to overcome the spring 218, the further supply of liquid is cut off and the escape of liquid which has been supplied is prevented so the pressure in the chamber of the right steer clutch is maintained. The pressure to which the liquid must increase in order to overcome the spring 218 is dependent upon the degree to which this spring has been compressed as a result of movement of the handle 230 so that valve element 212 operates automatically to vary the pressure of the liquid supplied to the steer clutch in accordance with the amount of movement of the control handle 230.

On movement of the control handle 230 to the right the pin 225 on the rocker arm 226 and associated with the valve element 214 causes this valve element to be moved upwardly. However, on this movement of the valve element 214, the land b continues to block groove 231 to which the supply pipe 183 is connected. In addition, the pipe 241 leading from the left steer clutch continues to be connected through the area between lands a and b of the valve element 214 to the passage in the body of the valve device 176 to which is connected the pipe 193 leading to the drain. Accordingly, when the control handle 230 is moved to the right to effect engagement of the right steer clutch the left steer clutch remains disengaged.

On movement of the control handle 230 to the left, the valve element 214 is moved downwardly and operates in substantially the same manner as explained in detail above in connection with valve element 212 to supply to the left steer clutch liquid under pressure which varies in accordance with the amount of movement of the control handle 230 away from its off position. In addition, on movement of the control handle 230 to the left the valve element 212 connects pipe 234 to the drain so that the right steer clutch is disengaged.

From the foregoing it will be seen that the valve device 176 provides means under the control of the operator to engage either the right steer clutch or the left steer clutch as desired, and to also adjustably vary the degree of engagement of either of these clutches.

From the foregoing it will be seen that the transmission provided by this invention is arranged to enable the rate at which the tracks on opposite sides of the vehicle are driven to be varied by power supplied from the steering shaft. The maximum amount by which the rates at which the two vehicle tracks are driven may be varied is determined by the rate at which the steering shaft is rotated. In this transmission the rate of rotation of the steering shaft is determined by the rate of rotation of the vehicle engine during periods of low vehicle speed, and is determined by the rate of rotation of the torque converter output member during periods of high vehicle speed. The steering shaft is driven through two overrunning clutches so that the steering shaft is automatically driven by the source having the higher rotational velocity. This arrangement insures that the vehicle will have the maximum rate of turn under all operating conditions.

Although we have illustrated and described one form of improved transmission for track type vehicles, it is to be understood that various changes and modifications may be made therein within the scope of the appended claims without departing from the spirit and scope of our invention.

We claim:

1. In a transmission for a motor vehicle having an engine and having ground engaging means at each side, said transmission comprising an input shaft adapted to be driven by said engine, a main drive shaft connected at one end through a first planetary gear set to means for driving a first ground engaging means at one side of the vehicle and connected at its other end through a second planetary gear set to means for driving a second ground engaging means at the other side of the vehicle, each of said planetary gear sets including a reaction member, reaction gear means connecting said reaction members, a steering clutch driving shaft, a left steer clutch for coupling said steering clutch driving shaft to means for driving said reaction gear means so as to relatively accelerate the first ground engaging means and to relatively retard the second ground engaging means, a right steer clutch for coupling said steering clutch driving shaft to means for driving said reaction gear means so as to relatively retard the first ground engaging means and to relatively accelerate the second ground engaging means, a hydraulic torque converter for transmitting torque from said input shaft to said main drive shaft, means including an overrunning clutch for driving said steering clutch driving shaft from said input shaft, and means including an overrunning clutch for driving said steering clutch driving shaft from the torque converter output element.

2. In a transmission for a motor vehicle having an engine and having a first ground engaging means at one side and a second ground engaging means at the other side, said transmission comprising a first driven member adapted to be connected to said first ground engaging means and a second driven member adapted to be connected to said second ground engaging means, an input shaft adapted to be driven by said engine, a hydraulic torque converter for transmitting torque from said input shaft to said first and second driven members, a steering shaft, manually controlled means for connecting said steering shaft through reaction gear means to said first and second driven members to relatively accelerate a selected one of said driven members and to relatively retard the other one of said driven members, means including an overrunning clutch for driving said steering shaft from said input shaft, and means including an overrunning clutch for driving said steering shaft from the torque converter output element.

3. In a transmission for a motor vehicle having an engine and having a first ground engaging means at one side and a second ground engaging means at the other side, said transmission comprising a first driven member adapted to be connected to said first ground engaging means and a second driven member adapted to be connected to said second ground engaging means, an input shaft adapted to be driven by said engine, a hydraulic torque converter for transmitting torque from said input shaft to said first and second driven members, a steering shaft, manually controlled means for at times connecting said steering shaft through reaction gear means to said first and second driven members to relatively accelerate said first driven member and to relatively retard said second driven member and for at other times connecting said steering shaft through said reaction gear means to said first and second driven members to relatively retard said first driven member and to relatively accelerate said second driven member, means including an overrunning clutch for driving said steering shaft from said input shaft, and means including an overrunning clutch for driving said steering shaft from said torque converter output element.

4. In a transmission for a motor vehicle having an engine and having a first ground engaging means at one side and a second ground engaging means at the other side, said transmission comprising an input shaft adapted to be driven by said engine, a main drive shaft connected at one end through a first planetary gear set to means for driving said first ground engaging means and connected at its other end through a second planetary gear set to means for driving said second ground engaging means, each of said planetary gear sets including a reaction member, reaction gear means connecting said reaction members, a steering shaft, manually controlled means for at times coupling said steering shaft through said reaction gear means to said reaction members to relatively accelerate said first ground engaging means and to relatively retard said second ground engaging means and for at other times coupling said steering shaft to said reaction members to relatively retard said first ground engaging means and to relatively accelerate said second ground engaging means, a hydraulic torque converter for transmitting torque from said input shaft to said main drive shaft, means including an overrunning clutch for driving said steering shaft from said input shaft, and means including an overrunning clutch for driving said steering shaft from the torque converter output element.

5. In a transmission for a motor vehicle having an engine and having a first ground engaging means at one side and a second ground engaging means at the other side, said transmission comprising an input shaft adapted to be driven from said engine, a main drive shaft, a hydraulic torque converter having an input element driven from said input shaft and having an output element driving said main drive shaft, a rotating element driven from said torque converter output element in such manner that the rotative speed of said rotating element exceeds the rotative speed of said input shaft when and only when the rotative speed of the torque converter output element exceeds a predetermined proportion of the speed of the torque converter input element, a steering shaft, means including an overrunning clutch for driving said steering shaft from said rotating element, means including an overrunning clutch for driving said steering shaft from said input shaft, a first driving means for driving said first ground engaging means from said main drive shaft, a second driving means for driving said second ground engaging means from said main drive shaft, and manually controlled means for connecting said steering shaft through reaction gear means to said first and second driving means so as at times to relatively accelerate said first ground engaging means and relatively retard said second ground engaging means and at other times to relatively retard said first ground engaging means and relatively accelerate said second ground engaging means.

6. In a transmission for a motor vehicle having an engine and having a first ground engaging means at one side and a second ground engaging means at the other side, said transmission comprising an input shaft adapted to be driven from said engine, a main drive shaft, a hydraulic torque converter having an input element driven from said input shaft and having an output element driving said main drive shaft, a rotating element driven from said torque converter output element in such manner that the rotative speed of said rotating element exceeds the rotative speed of said input shaft when and only when the rotative speed of the torque converter output element exceeds a predetermined proportion of the speed of the torque converter input element, a steering shaft, means including an overrunning clutch for driving said steering shaft from said rotating element, means including an overrunning clutch for driving said steering shaft from said input shaft, a first driving means including a first differential for driving said first ground engaging means from said main drive shaft, a second driving means including a second differential for driving said second ground engaging means from said main drive shaft, and manually controlled means for connecting said steering shaft with said first and second driving means so as at times to relatively accelerate said first ground engaging means and relatively retard said second ground engaging means and at other times to relatively retard said first ground engaging means and relatively accelerate said second ground engaging means.

7. In a transmission for a motor vehicle having an engine and having a first ground engaging means at one side and a second ground engaging means at the other side, said transmission comprising an input shaft adapted to be driven from said engine, a main drive shaft, a hydraulic torque converter having an input element driven from said input shaft and having an output element driving said main drive shaft, a rotating element driven from said torque converter output element in such manner that the rotative speed of said rotating element exceeds the rotative speed of said input shaft when and only when the rotative speed of the torque converter output element exceeds a predetermined proportion of the speed of the torque converter input element, a steering shaft, means for at times driving said steering shaft from said rotating element and for at other times driving said steering shaft from said input shaft, a first driving means for driving said first ground engaging means from said main drive shaft, a second driving means for driving said second ground engaging means from said main drive shaft, and manually controlled means for connecting said steering shaft through reaction gear means to said first and second driving means so as at times to relatively accelerate said first ground engaging means and relatively retard said second ground engaging means and at other times to relatively retard said first ground engaging means and relatively accelerate said second ground engaging means.

8. In a transmission for a motor vehicle having an engine and having a first ground engaging means at one side and a second ground engaging means at the other side, said transmission comprising an input shaft element adapted to be driven from said engine, a main drive shaft, a hydraulic torque converter having an input element driven from said input shaft and having an output element driving said main drive shaft, a rotating element driven from said torque converter output element in such manner that the rotative speed of said rotating element exceeds the rotative speed of said input shaft when and only when the rotative speed of the torque converter output element exceeds a predetermined proportion of the speed of the torque converter input element, a steering shaft, means for driving said steering shaft from said rotating element and from said input shaft element so that said steering shaft is driven by the one of said elements having the greater rotative speed, a first driving means for driving said first ground engaging means from said main drive shaft, a second driving means for driving said second ground engaging means from said main drive shaft, and manually controlled means for connecting said steering shaft through reaction gear means to said first and second driving means so as at times to relatively accelerate said first ground engaging means and relatively retard said second ground engaging means and at other times to relatively retard said first ground engaging means and relatively accelerate said second ground engaging means.

9. In a transmission for a motor vehicle having an engine and having a first ground engaging means at one side and a second ground engaging means at the other side, said transmission comprising an input shaft element adapted to be driven by said engine, a main drive shaft connected at one end through a first planetary gear set to means for driving said first ground engaging means and connected at its other end through a second planetary gear set to means for driving said second ground engaging means, each of said planetary gear sets including a reaction member, reaction gear means connecting said reaction members, an input shaft adapted to be driven by said engine, a hydraulic torque converter having an input member driven from said input shaft and having an output member driving said main drive shaft, a rotating element driven from said torque converter output member in such manner that the rotative speed of said rotating element exceeds the rotative speed of said input shaft element when and only when the rotative speed of the torque converter output member exceeds a predetermined proportion of the speed of said torque converter input member, manually controlled means for driving said reaction gear means from said input shaft element and from said rotating element so that said reaction gear means is driven by the one of said elements having the greater rotative speed, said manually controlled means being arranged so that at times said first ground engaging means is relatively accelerated and said second ground engaging means is relatively retarded and so that at other times said first ground engaging means is relatively retarded and said second ground engaging means is relatively accelerated.

10. In a transmission for a motor vehicle having an engine and having a first ground engaging means at one side and a second ground engaging means at the other side, said transmission comprising an input shaft element adapted to be driven by said engine, a main drive shaft connected at one end through a first planetary gear set to means for driving said first ground engaging means and connected at its other end through a second planetary gear set to means for driving said second ground engaging means, each of said planetary gear sets including a reaction member, reaction gear means connecting said reaction members, an input shaft adapted to be driven by said engine, a hydraulic torque converter having an input member driven from said input shaft and having an output member driving said main drive shaft, a rotating element driven from said torque converter output member in such manner that the rotative speed of said rotating element exceeds the rotative speed of said input shaft element when and only when the rotative speed of the torque converter output member exceeds a predetermined proportion of the speed of said torque converter input member, manually controlled means for driving said reaction gear means at adjustably variable rates from said input shaft element and from said rotating element so that said reaction gear means is driven by the one of said elements having the greater rotative speed, said manually controlled means being arranged so that at times said first ground engaging means is relatively accelerated and said second ground engaging means is relatively retarded and so that at other times said first ground engaging means is relatively retarded and said second ground engaging means is relatively accelerated.

11. In a transmission for a motor vehicle having an engine and having a first ground engaging means at one side and a second ground engaging means at the other side, said transmission comprising a first driven member adapted to be connected to said first ground engaging means and a second driven member adapted to be connected to said second ground engaging means, an input shaft adapted to be driven by said engine, a hydraulic torque converter for transmitting torque from said input shaft to said first and second driven members, a steering shaft, manually controlled means for at times connecting said steering shaft through reaction gear means to said first and second driven members to relatively accelerate said first driven member and to relatively retard said second driven member and for at other times connecting said steering shaft through said reaction gear means to said first and second driven members to relatively retard said first driven member and to relatively accelerate said second driven member, a first means for driving said steering shaft from said input shaft, and a second means for driving said steering shaft from said torque converter output element, said first and second means being arranged so that said steering shaft is driven by the one of said means which is effective to drive said shaft at the higher speed.

12. In a transmission for a motor vehicle having an engine and having a first ground engaging means at one side and a second ground engaging means at the other side, said transmission comprising a first driven member adapted to be connected to said first ground engaging means and a second driven member adapted to be connected to said second ground engaging means, an input shaft adapted to be driven by said engine, a hydraulic torque converter for transmitting torque from said input shaft to said first and second driven members, a steering shaft, manually controlled means for at times connecting said steering shaft through reaction gear means to said first and second driven members to relatively accelerate said first driven member and to relatively retard said second driven member and for at other times connecting said steering shaft through said reaction gear means to said first and second driven members to relatively retard said first driven member and to relatively accelerate said second driven member, a first means for driving said steering shaft from said input shaft, and a second means for driving said steering shaft from said torque converter output element, said second means being effective to drive said steering shaft more rapidly than said input shaft is effective to drive said shaft only when the speed of the torque converter output element exceeds a selected proportion of the speed of the torque converter input element, said first and second means being arranged so that said steering shaft is driven by the one of said means which is effective to drive said shaft at the higher speed.

13. In a transmission for a motor vehicle having an engine and having a first ground engaging means at one side and a second ground engaging means at the other side, said transmission comprising a first driven member adapted to be connected to said first ground engaging means and a second driven member adapted to be connected to said second ground engaging means, an input shaft adapted to be driven by said engine, a hydraulic torque converter for transmitting torque from said input shaft to said first and second driven members, a steering shaft, manually controlled means for at times connecting said steering shaft through reaction gear means to said first and second driven members to relatively accelerate said first driven member and to relatively retard said second driven member and for at other times connecting said steering shaft through said reaction gear means to said first and second driven members to relatively retard said first driven member and to relatively accelerate said second driven member, means for driving said steering shaft from the output element of said torque converter, and means for limiting the torque applied to said steering shaft through said torque converter, said last-named means comprising means effective when the speed of the torque converter output element is less than a predetermined proportion of the speed of the torque converter input element to drive said steering shaft from said input shaft independently of said torque converter.

14. In a transmission, in combination, an input shaft adapted to be connected to a source of power, a driven shaft adapted to be connected to a load, a hydraulic torque converter including impeller, reaction and turbine members, said impeller being driven by said input shaft, a first device for connecting said output shaft to said turbine member for normally transmitting multiplied torque drive from said input shaft to said driven shaft, and a second device adapted to directly connect said input shaft to said driven shaft, said second device being operative only when the speed of the impeller member exceeds the speed of the turbine member by a predetermined amount for reducing the torque load on said driven shaft.

15. In a transmission, in combination, an input shaft adapted to be connected to a source of power, a driven shaft adapted to be connected to a load, a hydraulic torque converter including impeller, reaction and turbine members, said impeller being driven by said input shaft, a multiple clutching device for alternatively connecting said output shaft with either said input shaft or said turbine member, said device including an element movable to a first position connecting said turbine member and said output shaft for transmitting multiplied torque drive from said input shaft to said driven shaft, said element being movable to a second position connecting said output shaft directly to said input shaft, said element being movable from said first position to said second position only when the speed of the impeller member exceeds the speed of the turbine member by a predetermined amount for reducing the torque load on said driven shaft.

References Cited in the file of this patent

UNITED STATES PATENTS

| Number | Name | Date |
|---|---|---|
| 1,797,797 | Saives | Mar. 24, 1931 |
| 2,185,731 | Hubbell | Jan. 2, 1940 |
| 2,260,581 | Pollard | Oct. 28, 1941 |
| 2,368,873 | Pollard | Feb. 6, 1945 |
| 2,378,577 | Oldfield | June 19, 1945 |
| 2,449,608 | LeMay | Sept. 21, 1948 |
| 2,450,056 | Peterson | Sept. 28, 1948 |
| 2,467,108 | Barlow | Apr. 12, 1949 |
| 2,519,279 | Peterson | Aug. 15, 1950 |
| 2,523,766 | Kelley | Sept. 26, 1950 |
| 2,560,554 | Colby | July 17, 1951 |
| 2,585,790 | Kelley | Feb. 12, 1952 |
| 2,596,931 | Kelley | May 13, 1952 |

FOREIGN PATENTS

| Number | Country | Date |
|---|---|---|
| 907,690 | France | Mar. 19, 1946 |